United States Patent
Luber (12)

(10) Patent No.: US 6,244,352 B1
(45) Date of Patent: Jun. 12, 2001

(54) SHOEING SYSTEM FOR REDUCING BUMPINGS ON HORSES HOOVES

(76) Inventor: Josef Luber, Egerer Strasse 46, 92224 Amberg (DE)

( * ) Notice: Subject to any disclaimer, the term of this patent is extended or adjusted under 35 U.S.C. 154(b) by 0 days.

(21) Appl. No.: 09/147,027

(22) PCT Filed: Mar. 12, 1997

(86) PCT No.: PCT/DE97/00472

§ 371 Date: Sep. 14, 1998

§ 102(e) Date: Sep. 14, 1998

(87) PCT Pub. No.: WO97/33468

PCT Pub. Date: Sep. 18, 1997

(30) Foreign Application Priority Data

Mar. 14, 1996 (DE) .......................................... 296 04 676 U
Nov. 13, 1996 (DE) .......................................... 296 14 112 U

(51) Int. Cl.⁷ ...................................................... A01L 7/02
(52) U.S. Cl. ................... 168/12; 168/13; 168/16
(58) Field of Search .................. 168/12, 13, 16, 168/11, 4

(56) References Cited

U.S. PATENT DOCUMENTS

| 206,939 | * | 8/1878 | Fetter | 168/12 |
|---|---|---|---|---|
| 301,721 | * | 7/1884 | Jaffray | 168/11 |
| 302,185 | * | 7/1884 | Atwood | 168/11 |
| 429,460 | * | 6/1890 | Linn | 168/11 |
| 479,912 | * | 8/1892 | Mooney | 168/13 |
| 624,529 | * | 5/1899 | Paar | 168/12 |
| 626,091 | * | 5/1899 | Peter et al. | 168/12 |
| 770,917 | * | 9/1904 | Myers | 168/12 |
| 823,497 | * | 6/1906 | Alarme | 168/12 |
| 869,838 | * | 10/1907 | Green | 168/11 |
| 1,212,266 | * | 1/1917 | Schrader et al. | 168/12 |
| 1,953,281 | * | 4/1934 | Veran | 168/13 |
| 2,096,504 | * | 10/1937 | Anderson | 168/13 |
| 3,180,421 | * | 4/1965 | Hirshberg et al. | 168/12 |
| 3,952,807 | * | 4/1976 | Cattaneo | 168/28 |
| 4,207,947 | * | 6/1980 | Cope et al. | 168/4 |
| 4,557,334 | * | 12/1985 | Cattaneo | 168/12 |
| 4,760,885 | * | 8/1988 | Benning | 168/11 |
| 5,180,017 | | 1/1993 | Alagna | 168/12 |

FOREIGN PATENT DOCUMENTS

| 355598 | * | 6/1905 | (FR) | 168/12 |
|---|---|---|---|---|
| 7997 | * | of 1894 | (GB) | 168/12 |
| 224407 | * | 11/1924 | (GB) | 168/12 |

OTHER PUBLICATIONS

International Search Report—PCT/DE97/00472, completed Jul. 28, 1997.

* cited by examiner

*Primary Examiner*—Peter M. Poon
*Assistant Examiner*—Son T. Nguyen
(74) *Attorney, Agent, or Firm*—Hoffman, Wasson & Gitler

(57) ABSTRACT

A shoeing system for horses' hooves comprises a shoe (3) and shoe insert (2) of shock-absorbing material between the hoof and shoe. The single-part or multiple-part insert (2) is matched to the shape of the horse shoe (3) and is nailed in the front area between the hoof and shoe and can move in the rear area with the hoof relative to the shoe. This mobility is ensured by a sliding member (26) situated between the insert (2) and the shoe (3) and capable of moving relative to the shoe. In the heel area, the insert is provided on its inner side with beading (22) which both permits and restricts displacement of the insert.

12 Claims, 9 Drawing Sheets

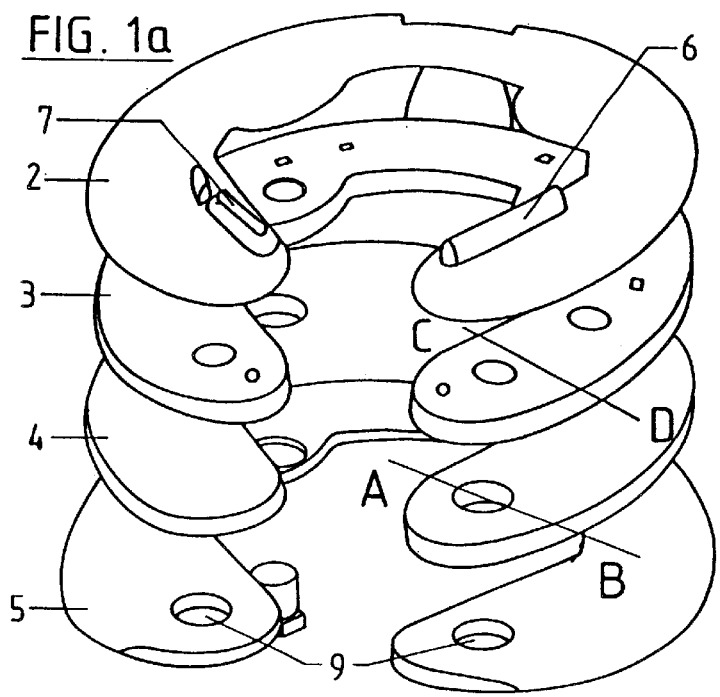
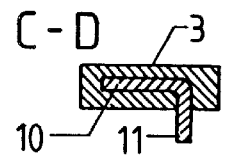
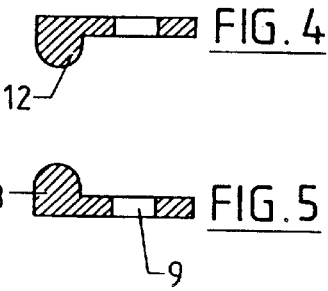
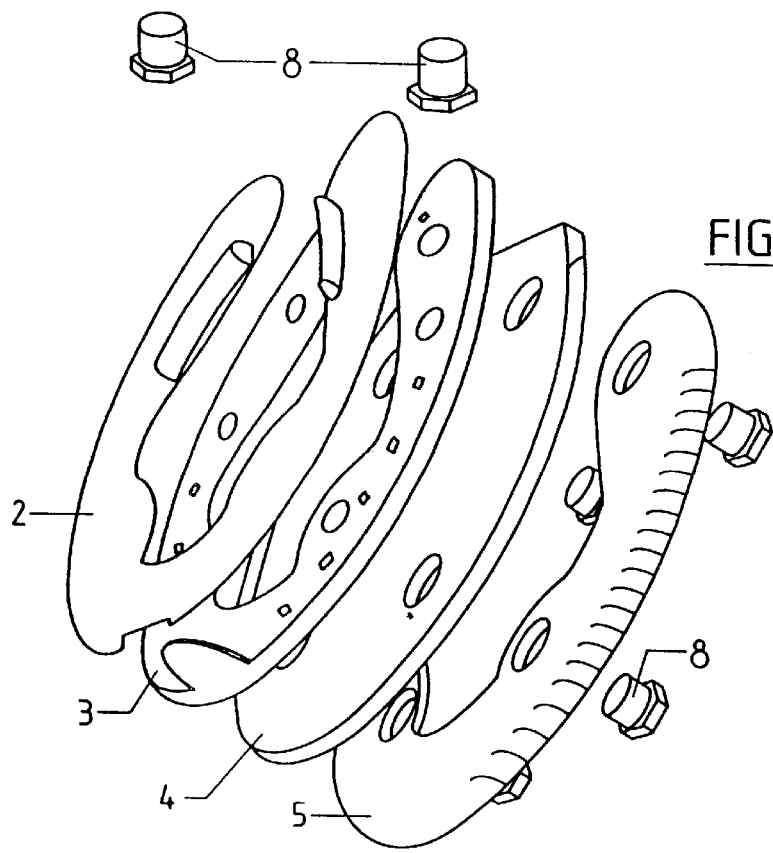

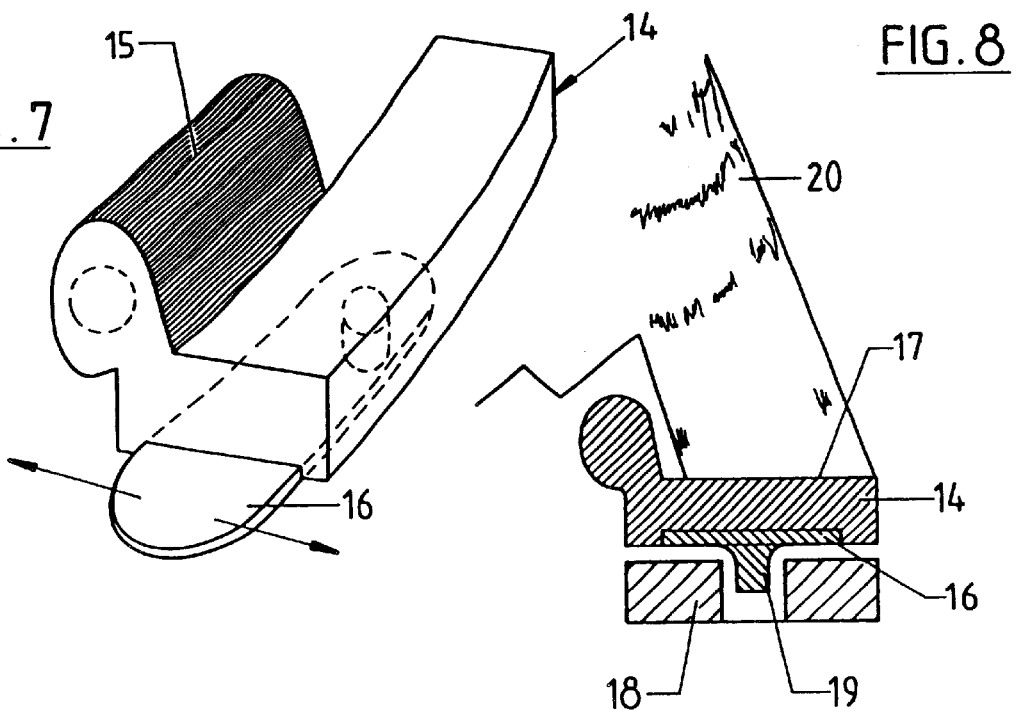
FIG. 7
FIG. 8
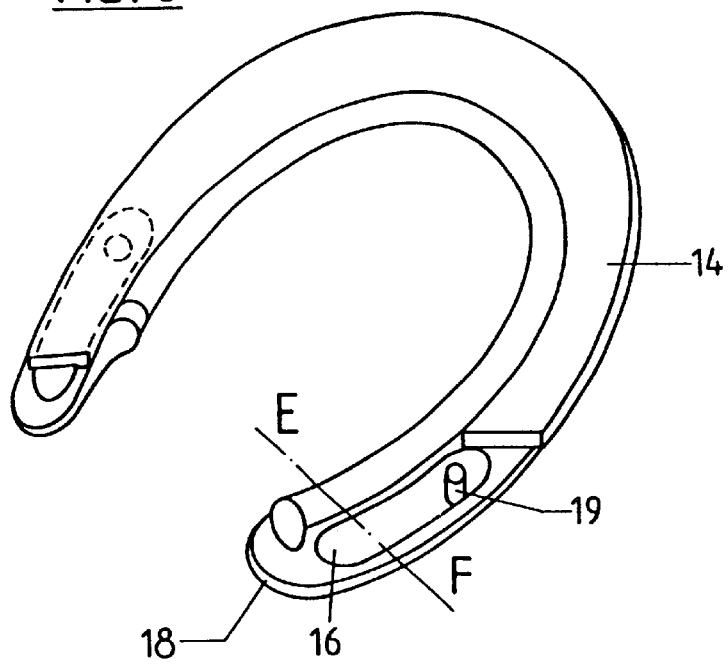
FIG. 6

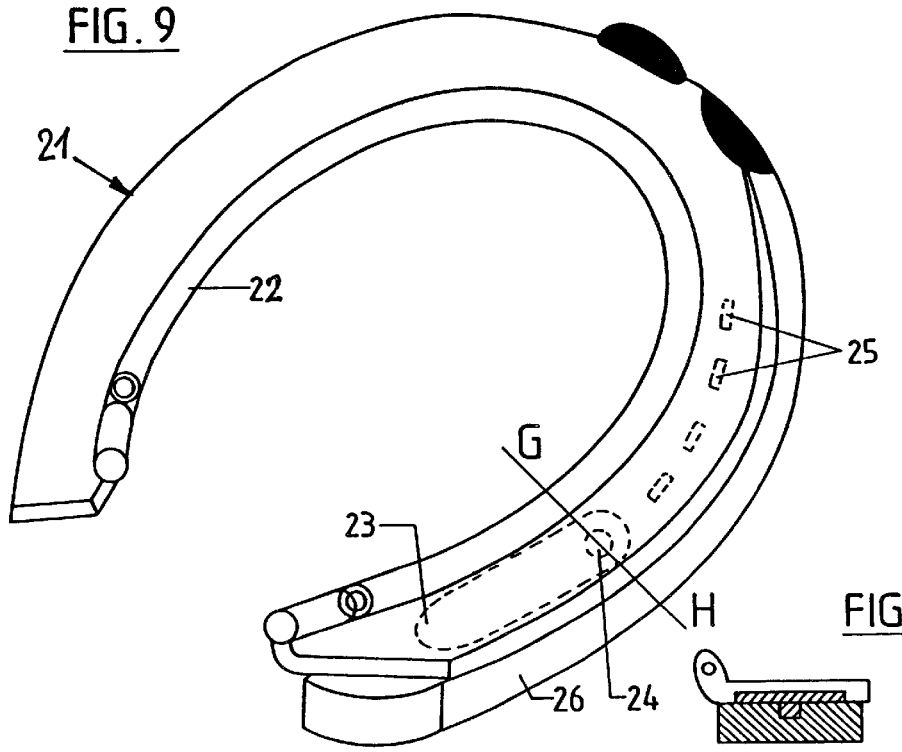
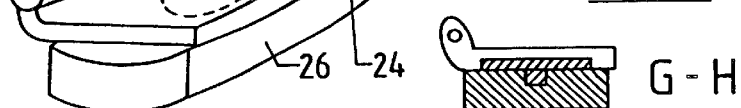
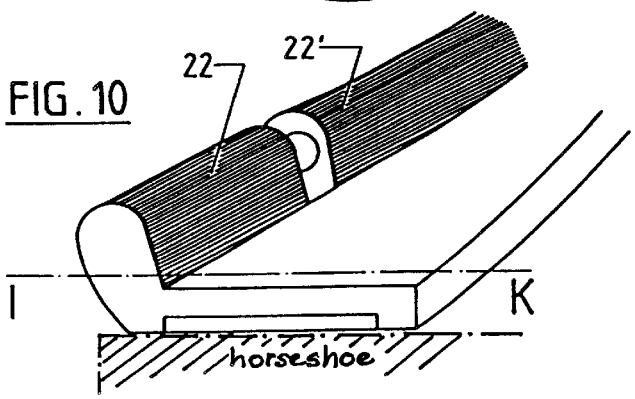
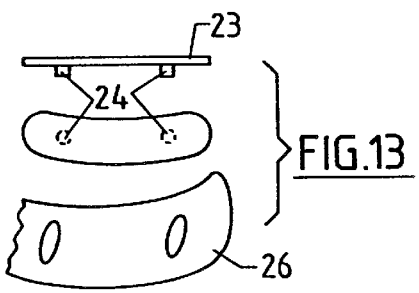
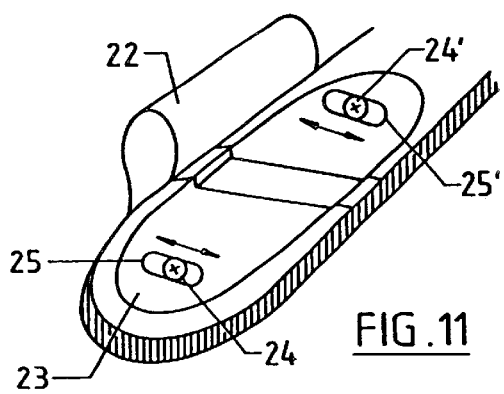
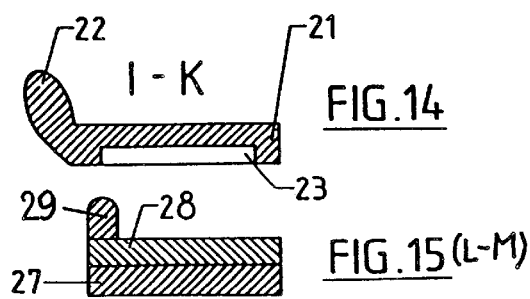

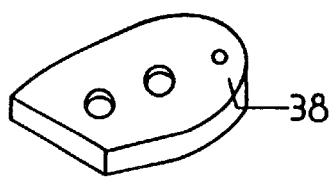
FIG. 21
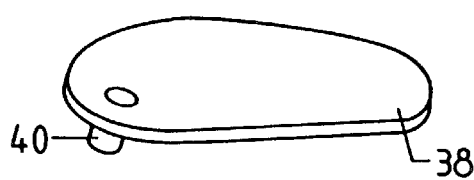
FIG. 22
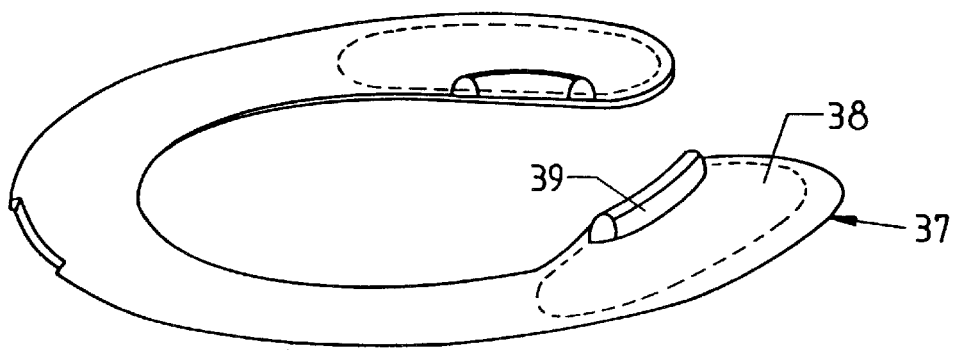
FIG. 20
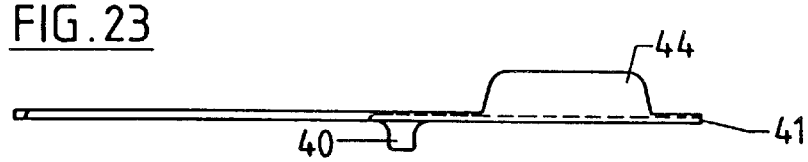
FIG. 23
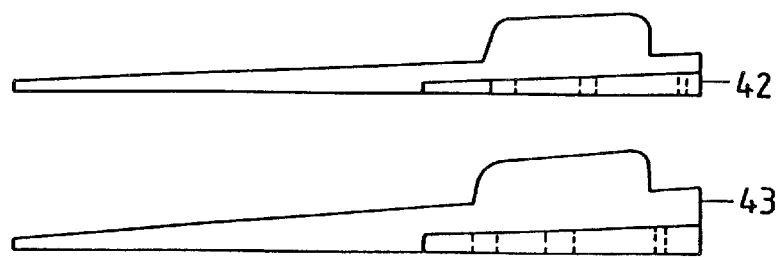
FIG. 24
FIG. 25

FIG. 26
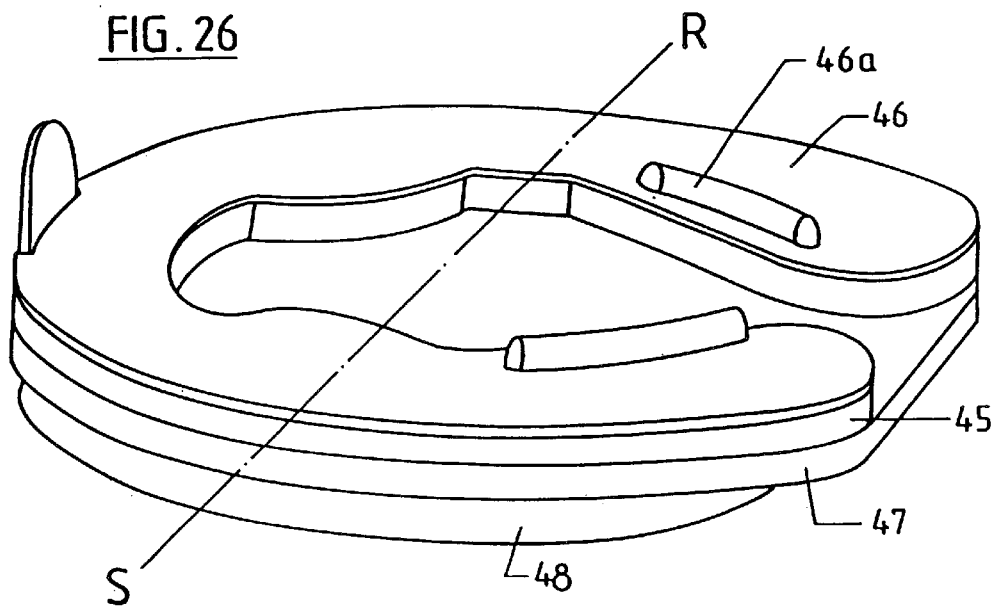
FIG. 27   R-S
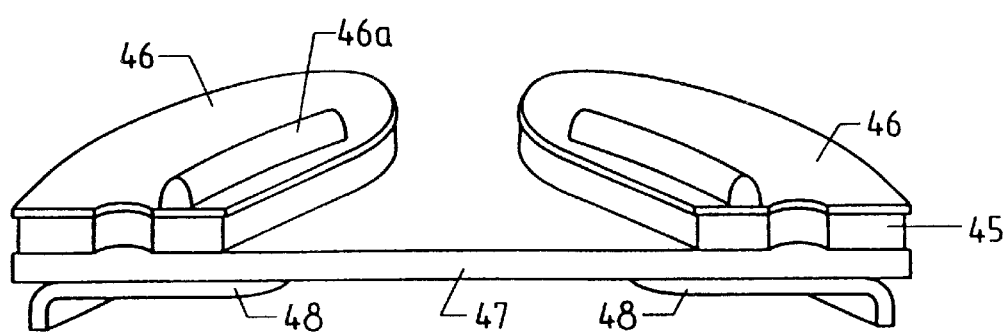
FIG. 29
FIG. 28
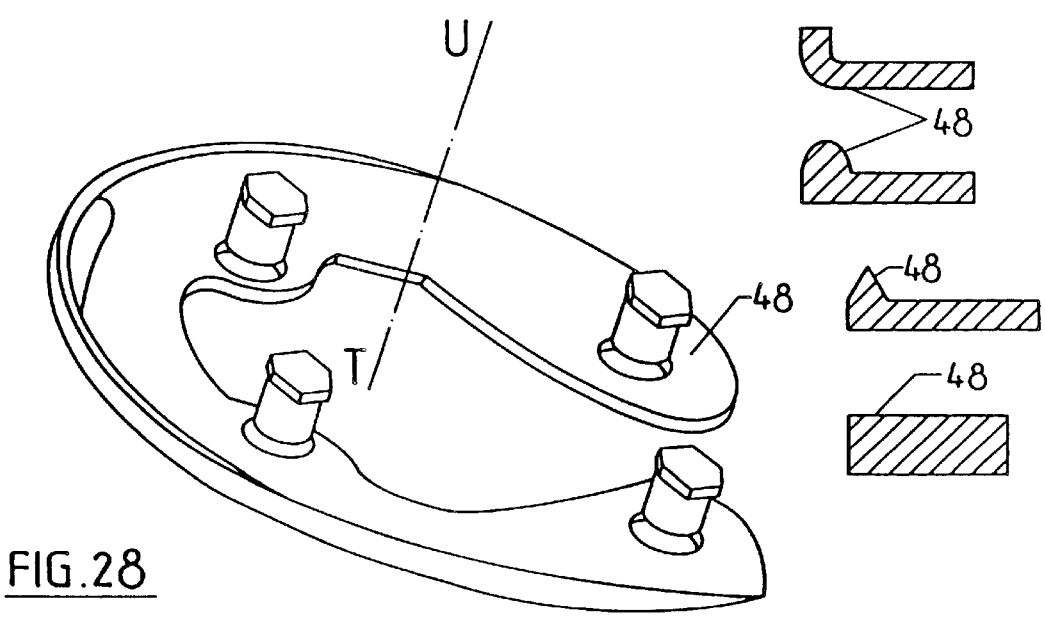

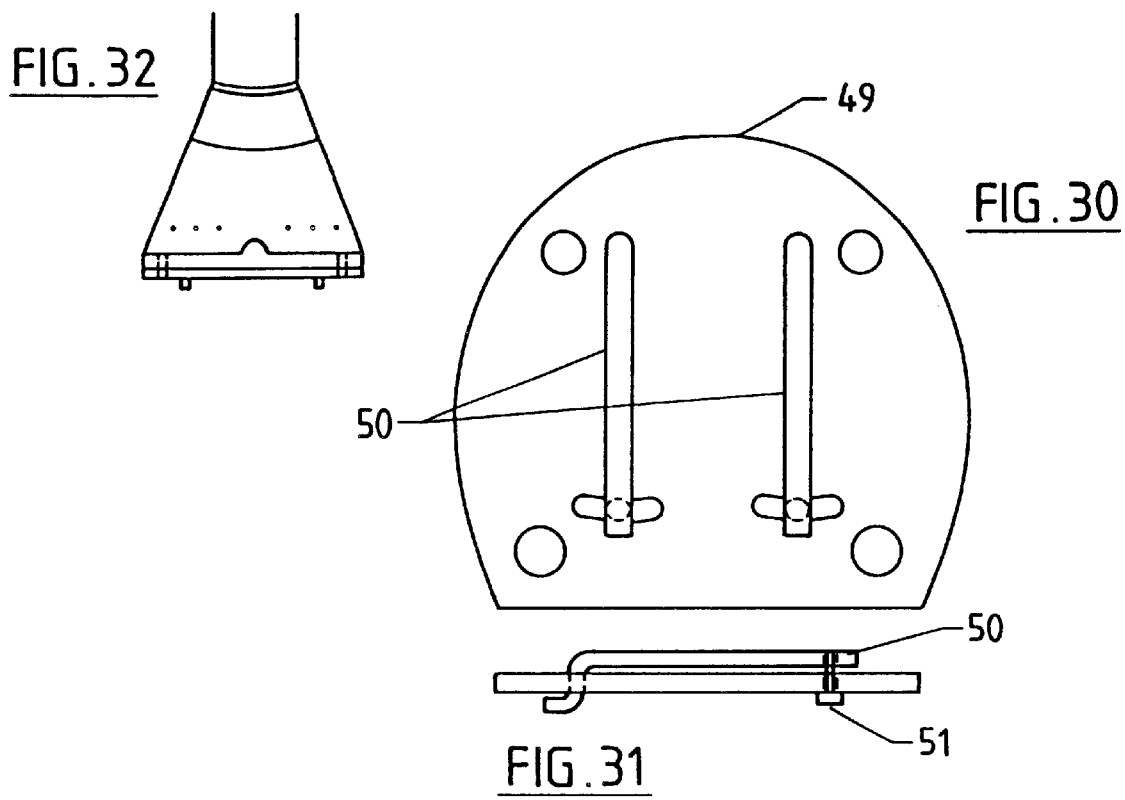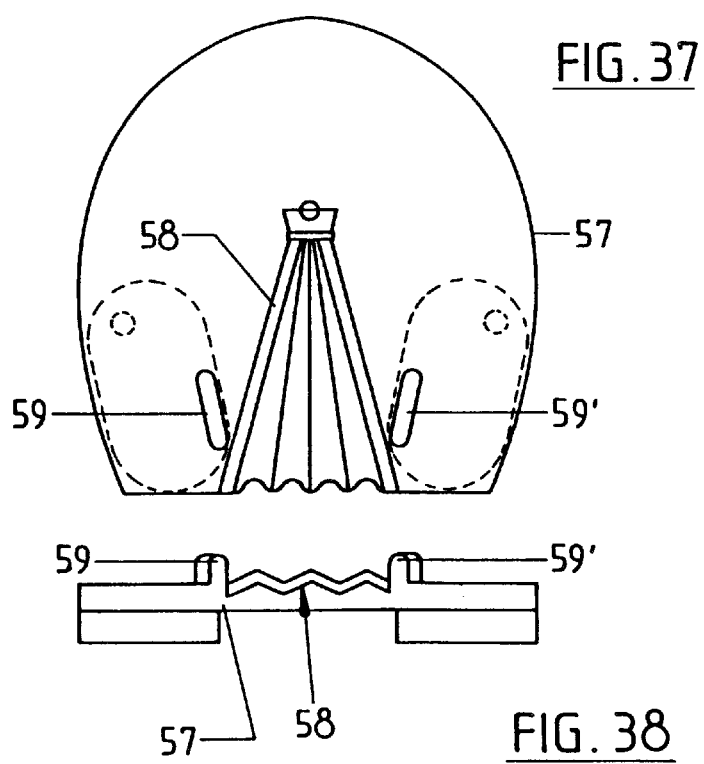

SHOEING SYSTEM FOR REDUCING BUMPINGS ON HORSES HOOVES

BACKGROUND OF THE INVENTION

This invention refers to shoeing systems having a horse shoe or a base carrier and a shoe insert of attenuating material such as rubber, plastic, or the like, between the hoof and the shoe. The one part or two part insert is adapted to form the shape of the horse shoe. The insert is nailed in the front area between the hoof and shoe and is moved laterally and relative to the shoe interior area together with the hoof.

Legs of horses, especially of riding and jumping horses, are extremely sensitive and prone to injuries. Because the hocks are mainly grown of horn, bones and tendons, and have little muscle volume they undergo extremely high strains in the form of vibrations, shocks and impacts. With a horse's hoof a movement called hoof mechanism is created within the hoof. With common shoe insets this movement is decelerated. Without shoe inserts said movement happens between the hoof and the horse shoe, with the result that the hoof is ground down in the hoof area causing the hoof to be in the wrong position.

In general, the horses+ hooves are shoed with horse shoes which are nailed onto the hoof. There are also known orthopaedic shoeing systems with a plate of leather or plastic material fastened with nails between the hoof and the horse shoe. In order to substitute this plate, when it is worn out, the nailing connection at the hoof has to be destroyed. This system is not hygienic and gives rise to inflammation because it is not possible to clean the sole area of the hoof.

It is an object of this invention to provide a shoeing system which allows optimum comfort to the horse and a high degree of cushioning and energy absorption when landing after a jump, which guarantees a perfect fit and support against twisting of the hoof, and which provides a controllable heel mechanism without any wear of the horn.

According to this invention this objet is solved by a one part or two part insert which is adapted to the form of the horse shoe, and in the front area is nailed between the hoof and the horse shoe and is moved laterally and relative to the horse shoe in the rear area together with the hoof.

U.S. Pat. No. 5,180,017 discloses a shoeing system comprising a horse shoe plate or a base support, a replaceable horse shoe pad of cushioning material between hoof and horse shoe plate, and a firm connection of the horse shoe plate and the horse shoe pad with the hoof. The pad consists of a replaceable sole plate with several cleat-like members which are in contact with the soil ad which extend outwardly from the pad opposite the hoof, and which pass through apertures in the horse shoe plate. Horse shoe plate and horse shoe pad are fastened onto the hoof by means of nails through apertures within the horse shoe and the horse shoe pad so that the pad is stationary connected with the horse shoe and the hoof along the active extension of the horse shoe, and accordingly, the horse shoe pad cannot move relative to the hoof nor the horse shoe.

SUMMARY OF THE INVENTION

In order to protect the hoof against vibrations and impacts, and to allow the sole area of the hoof to be cleaned, the base carrier (the horse shoe) is embedded in cushioning material. The contact surface can be quickly assembled and disassembled by an unskilled person. Before the base carrier is fastened onto the hoof a thin cushioning ring of flexible material, e.g. of rubber, plastic or the like shaped according to the base carrier which allows the sole area to be accessed, is fastened by nails. In this manner the base carrier is not positively in contact with the hoof. The cushioning ring acts as a compensation means for vibrations and impacts. Because it is adapted to the shape of the base carrier and is not a solid plate as usual, the sole area can be cleaned and the hoof is able to "breathe." Moreover, the cushioning ring serves to balance smaller uneven areas between the rim of the hoof and the base carrier so that with hot shoeing or also cold shoeing a complete fit is guaranteed.

The base carrier according to the invention can be provided with contact surfaces which according to the conditions, e.g. harder or softer soil, can be chosen at will. This contact surface can be a combination of steel and rubber which in addition compensates the vibration and impacts. The steel core of the base carrier can be embedded from top to bottom into attenuation material and therefore, is insulated in view of oscillations and vibrations. This is of advantage insofar, as the required stability of the steel can be used without there being the disadvantages of vibration.

By means of different profiles of differing grip, variable contact surfaces can be provided for. With the variable contact surfaces the "track" of the horse's legs can be adjusted, as is required for so-called Western riding. With a closed contact surface which is screwed onto the horse shoe, it is possible, by horizontally twisting the horse shoe, to make the track irons on the contact surface extend more inwardly rather than outwardly. This allows to adapt the track of the horse's legs to the soil condition available without needing the assistance of a blacksmith. Altering the track can be achieved by rotating the entire contact plate or by altering the movable track iron.

In order to avoid the desired incorrect positions of the hoof, according to the subject invention, a slide member is inserted into the shoe insert in the heel area which is directed towards the horse shoe and the gliding ability thereof is higher than that of the shoe insert. In this manner, the hoof mechanism is improved and the horn wear considerably reduced. By means of a bead (or elevation) the shoe insert is fixed at the inner side so that fastening by means of nails, rivets or the like is not necessary. A bead at the shoe insert prevents direct and dung from collecting within the hoof so that the hoof is protected against rotting between the hoof sole and the horse shoe. This type of bead is formed at the inner side of the shoe inset covering the entire periphery and extending upwardly towards the hoof. If any pressure is exerted on the bead the bead is pressed against the hoof and protects the hoof against deposits between the hoof and the horse shoe. Furthermore, this will prevent the dirt from collecting within the hoof.

According to a preferred embodiment of this invention, the base carrier or the horse shoe is made of a light-weight metal or PVC in order to reduce weight. These materials show rather high wear so that the thickness chosen for the horse shoe should be greater. In order to avoid wear and tear, the base carrier of light-weight metal or PVC is provided with wear-resistant material, e.g. V2a, ceramics, tools steel, hard metal, or the like. The horse shoe on the base carrier is provided with a contact surface having an extension, and the extended gripping rim extends along the outer portion of the base carrier; within the nail area the gripping rim extends along the outer portion of the base carrier; within the nail area the gripping rim is outside of the nail line. The griping rim forms one piece with the horse shoe. It can be used as a substitute for stakes. In order to improve the grip, the wear-resistant portions are projecting or are poured in plane in order to reduce considerably wear. The wear portions e.g.

are made in one piece and embrace the entire hoof in the form of a horse shoe; alternatively, they can be made of several short portions which are arranged distant from each other around the entire periphery of the horse shoe. In order to improve the statics at the horse shoe and in order to prevent the heel portion of the hoof from sinking too much into the soil, when riding occurs on softer soil, which would be a danger for the flexor muscle mechanism, the base carriers are placed in the area of the heel starting from the third or fourth nail hole towards the end in a widened shape. The widening is at least 5 mm. This will allow that the heels during the movement of the heel mechanism always move on the horse shoe and will never slide beyond it.

BRIEF DESCRIPTION OF THE DRAWINGS

The following is a description of embodiments of the invention in combination with the drawings which show:

FIG. 1a is a different embodiment of a shoeing system according to the invention of FIG. 1;

FIG. 2a is the embodiment of FIG. 1a in perspective lateral view;

FIG. 3 is a cross-section along line C-D of FIG. 1;

FIG. 4 is a cross-section along line A-B of FIG. 1;

FIG. 5 is a cross-section of a variation of FIG. 4;

FIG. 6 is another embodiment of a base carrier with attenuation insert;

FIG. 7 is in an enlarged scale a section from FIG. 6 with gliding member in perspective view;

FIG. 8 is a cross-section of the drawing along line E-F of FIG. 6;

FIG. 9 is a further embodiment of a base carrier with attenuation insert in perspective view;

FIG. 10 is a detailed view of bead means according to FIG. 9;

FIG. 11 is a detailed view of a gliding member according to FIG. 9 with attenuation inset and bead;

FIG. 12 is a cross-section through FIG. 9 along line G-H;

FIG. 13 is a drawing of a gliding member in lateral cross-sectional view;

FIG. 14 is a cross-section of a shoe insert with gliding member along sectional line I-K;

FIG. 15 is a cross-sectional view of another embodiment of the shoe insert with gliding member;

FIG. 20 is a further embodiment of a shoe insert according to the invention;

FIGS. 21, 22 are drawings of gliding members with fixing pins;

FIGS. 23, 24, 25 are different embodiments of shoe inserts in lateral view;

FIG. 26 is a further embodiment of a shoe insert with base carrier in perspective view;

FIG. 27 is a cross-sectional view of the shoe insert according to FIG. 26 along line R-S of FIG. 26;

FIG. 28 is an exchangeable contact surface for the drawing of FIG. 26;

FIG. 29 is four different shapes of profile of the exchangeable contact surfaces according to FIG. 28 in cross-section;

FIG. 30 is a plane view of a closed contact surface;

FIG. 31 is a rear view of the contact surface according to FIG. 30;

FIG. 32 is a schematic picture of a hoof with a contact surface fastened thereon;

FIG. 37 is a plan view of an attenuation insert extending over the full area; and FIG. 38 is an end view of the drawing of FIG. 37.

DETAILED DESCRIPTION OF THE INVENTION

Figure 1:
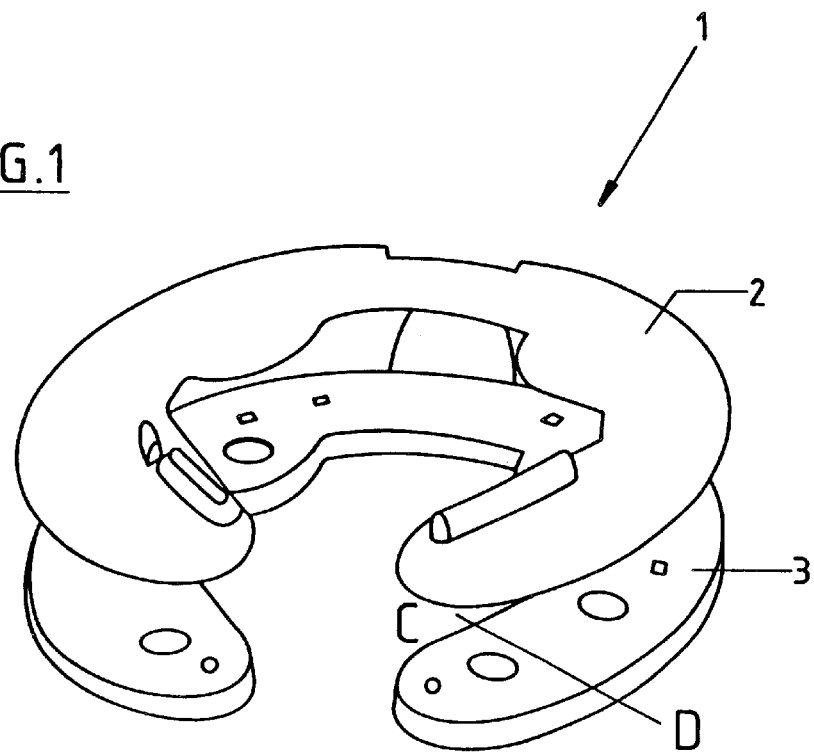
FIG. 1 is an embodiment of a shoeing system according to the invention in an explosive view from the rear side.
Figure 2:
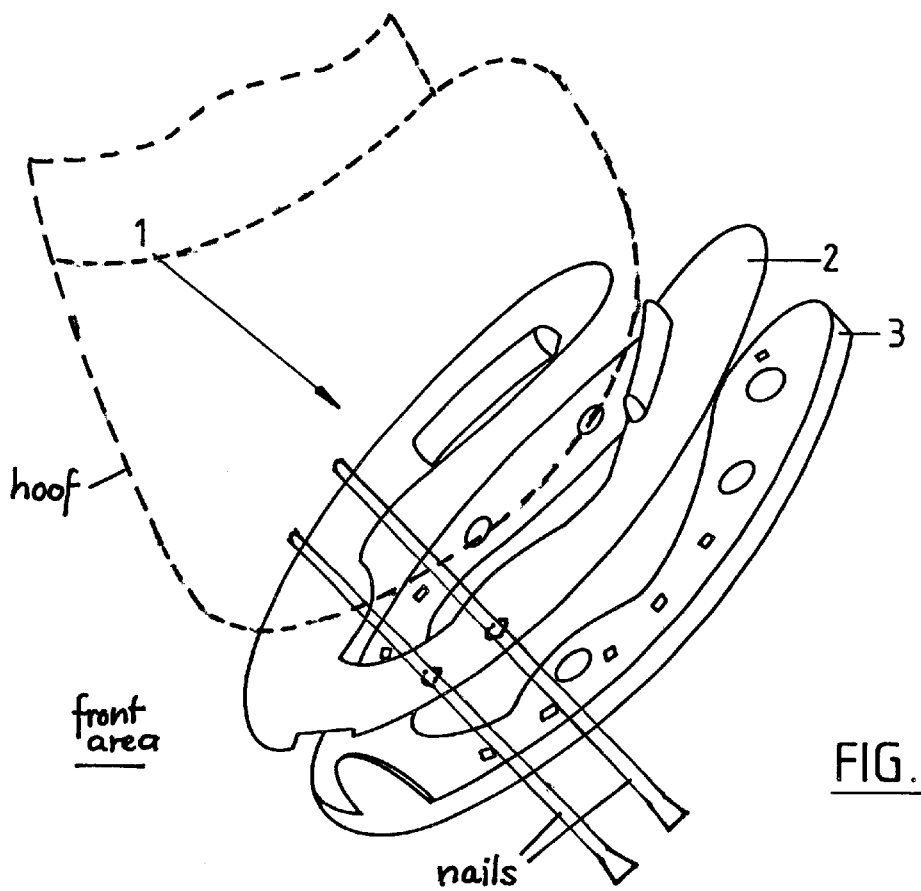
FIG. 2 is the embodiment of FIG. 1 in perspective lateral view.
Figure 16:
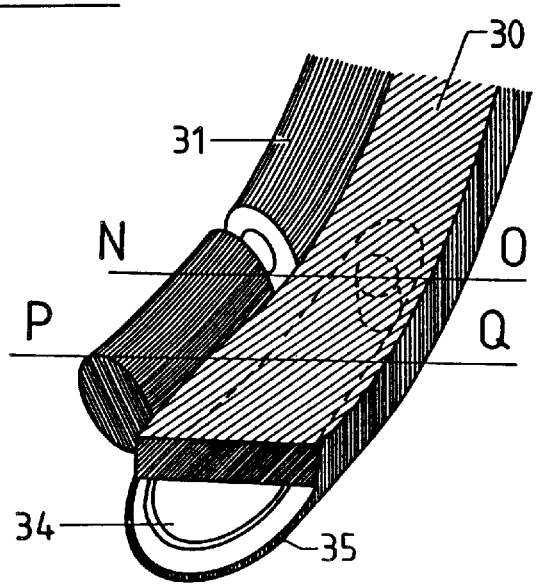
FIG. 16 is a sectional view of a further embodiment of a shoe insert with inner bead.
Figure 17:
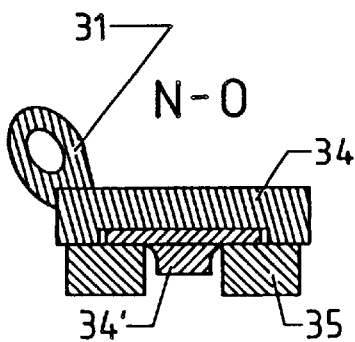
FIG. 17 is a sectional view along line N-O of FIG. 16.

According to FIGS. 1 and 2 the shoeing system 1 comprises an attenuation insert or a shoe insert 2 of attenuating material, e.g. rubber, plastics, or the like. The shoe insert 2 is arranged within a horse shoe or a base carrier for base body 3 so that the lower side of the hoof is supported on the horse shoe 3 with the intermediate layer of the attenuation insert 2. With an embodiment of FIGS. 1a and 2a a second attenuation insert 4 is arranged, which is exchangeable and preferably closed, and is provided with a profile gripping iron 5 with open, exchangeable contact surface, whereby the profile gripping iron forms the walking surface of the shoeing system and is in contact with the soil, and whereby the second attenuation insert 4 is a compensating means between the two irons 3 and 5. The second attenuation insert preferably is of different color for different types of use, and can be provided with markings, e.g. a logo and similar advertisement elements at the outer side or the underside which is the side to be viewed when the hoof is lifted.

The shoe insert 2 is provided with bead sections 6,7 in the area at both sides of the open horse shoe ends (rear part of the iron 3) which at the inner side of the shoe insert 2 are formed as extensions projecting upwardly and stabilizing the hoof inwardly which means they compensate and restrict any pressure on the hoof inwardly and outwardly. The profile gripping irons 5 are screwed into bores 9 of the gripping irons 5 by means of cleats or stakes 8, or are fastened in a corresponding manner, and are releasably mounted through the second attenuation insert 4 with the base carrier 3. The cleats support the hoof when the hoof is put on soil.

Within the base carrier 3 (FIG. 3) the profiles 11 are inserted or poured in as wear portions made of the same or different material which, if the base carrier 3 is the lowermost side of the shoeing system, give the horse when jumping and running the necessary support, and which can fulfill the function of cleats.

FIG. 4 shows a cross-section through the attenuation insert 4 with downwardly directed inner bead 12, FIG. 5 a cross-section through the attenuating insert 4 with upwardly extending inner bead 13.

FIG. 6 shows a shoe insert 14 with heel mechanism which is provided with an inner bead 15 formed in one piece. The bead can be solid or hollow, e.g. a hose, can be arranged at each side in a single piece, can be interrupted, profiled or formed in similar manner. The shoe insert 14 is provided with a recess 17 at the bottom surface, into which a gliding member 16 of metal, plastic or similar wear-resistant material is inserted, which is positioned by means of a fixing pin 19 to the horse shoe 18 beneath. The hoof 20 is supported on the insert 15 and is prevented by the bead 15 from an inwardly directed lateral movement. The gliding member 16 is provided within the area of the heel. It has a higher degree of glidability than the shoe insert so that the hoof mechanism is improved and the wear of horn with corresponding stresses on the hoof is greatly reduced.

The shoe insert 21 is provided with an inner bead 22 extending around the entire periphery, and with a gliding member 23 inserted within the shoe insert 21, within the two rear areas of the horse shoe. The gliding member 23 is fixed by at least one fixing pin 24 to the horse shoe 26, 25 show nail positions by means of which the horse shoe 26 is fastened to the gliding member at the horse's hoof. The shoe insert 21, as shown in FIG. 10, is formed in one piece with the inner bead 22, which is of solid material or, as shown in the drawing, as a hose 22'. In a further embodiment according to FIG. 11 the gliding member 23 is fastened to the horse shoe 26 by means of two fixing pins 24, 24'. The gliding member 23 is provided with recesses 25, 25', e.g. as longitudinal holes so that the gliding member 23 is adjustable relative to the horse shoe in the direction of the arrow, and is laterally shiftable if the hoof is stressed.

FIGS. 12–15 show different cross-sections for the shoe insert with gliding member, whereby FIG. 12 is a cross-section along line G-H of FIG. 9. FIG. 13 shows the gliding member 23 with two fixing pins 24, 24' which are fastened in corresponding bores or recesses of the horse shoe 26 shown in part. FIG. 14 shows a cross-section I-K of the shoe insert 21 and the bead 22 with gliding member 23. FIG. 15 shows another embodiment of a shoe insert 27 with gliding member 28 which has the same width as the shoe insert and has a fixing bead 29. The picture according to FIG. 15 shows a cross-section along line L-M.

Figure 18:
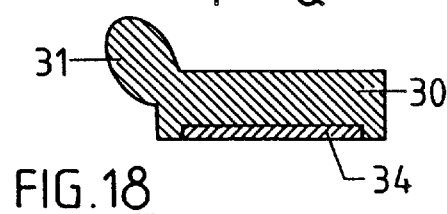
FIG. 18 is a sectional view along line P-Q of FIG. 16.
Figures 19, 19A, 19B:
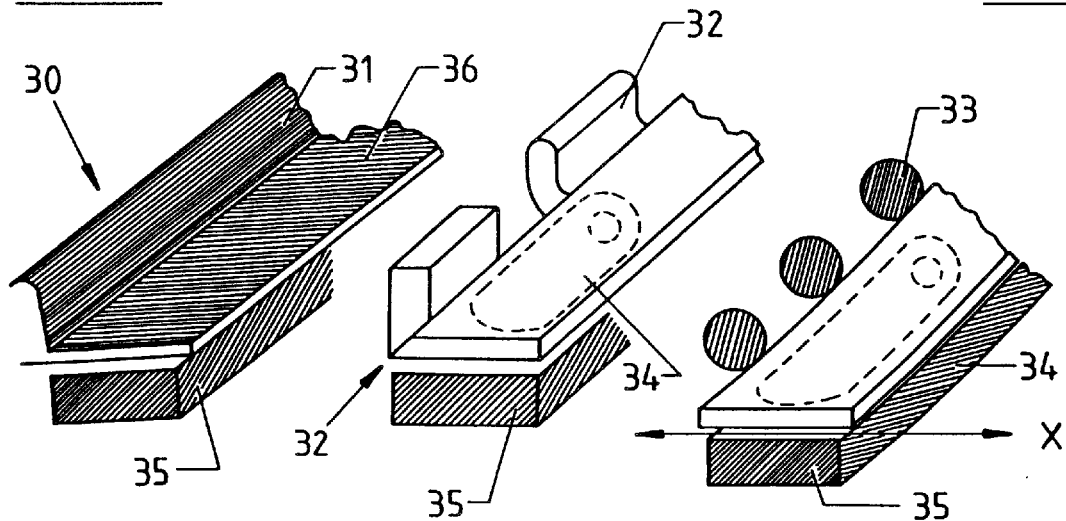
FIGS. 19, 19a and 19b are various embodiments of bead means.

FIGS. 16, 17, 18 and 19, 19a, 19b are various embodiments of bead arrangements of a shoe insert 30. The beads 31 are inner beads of the shoe insert in solid or in hose-type which means hollow form. The bead 32 is an interrupted bead which comprises individual sections 32, and the bead 33 consists of individual, finger-type elements which are also made in one piece with the shoe inset 30. The gliding member is shown by reference numeral 34 each, the horse shoe by 35. The shoe insert 30 according to FIG. 17 with hose-type bead 31 shows a gliding member 34 with fixing pin 34'; the picture according to FIG. 18 is a shoe insert 30 with solid bead 31 and a sliding member 34 without any fixing pin. FIG. 19 shows a shoe insert 30 with solid bead and a layer 36 to be nailed on.

FIGS. 20–25 show embodiments of a shoe insert 37 with gliding member 38 and beads 39. The gliding member 38 is provided with a fixing pin 40 at one fastening end at the hoof or the horse shoe so that the gliding members are movable each around the axis of the fixing pin 40 within the plane of the shoe insert together with the shoe insert. FIGS. 23, 24 and 25 show shoe inserts with a continuous inclination from the toe to the heel of the hoof. These various embodiments of shoe inserts are marked by 41, 42, and 43 which are formed as wedge-type inserts. They can be formed in one piece with the horse shoe; alternatively they can be made of two parts so that the shoe inserts form only one leg each of a horse shoe so that the shoe insert is subdivided, whereby both parts are connected with the horse shoe at the front end. At the wedge inserts 41, 42, 43 a short inner bead 44 is formed for each. In this embodiment the wedge insert is merely arranged at the rear end of the hoof, however, the shoe insert can be formed as a one-part shoe insert in the shape of a horse shoe as a wedge insert.

FIGS. 26, 27, 28, and 29 show embodiments of a base carrier or a horse shoe 45 with shoe insert 46 and inner, short bead 46a in connection with an exchangeable, closed plate 47 of rubber or plastic, and an exchangeable contact surface or griping iron 48 which in FIG. 2 is marked and shown as profile iron 5.

Figure 33:
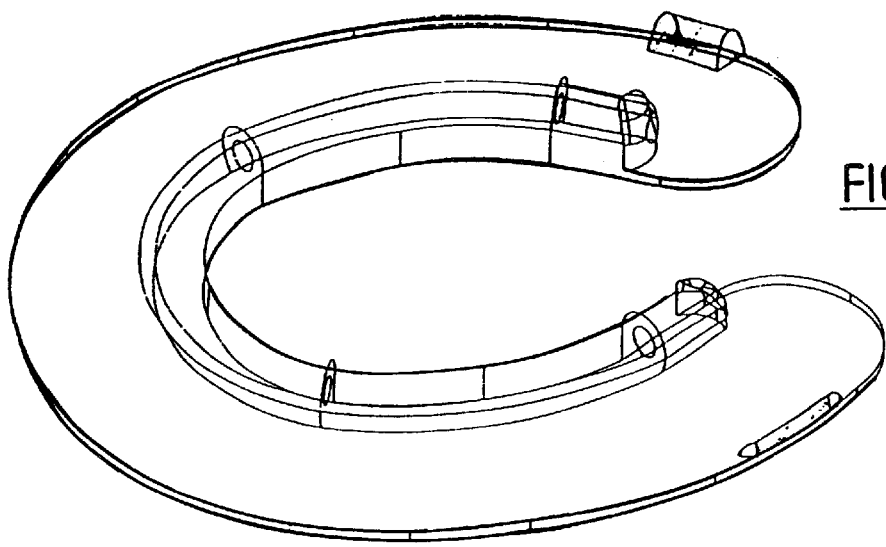
FIG. 33 is a schematic, perspective view of a further embodiment of a shoe insert.
Figure 34:
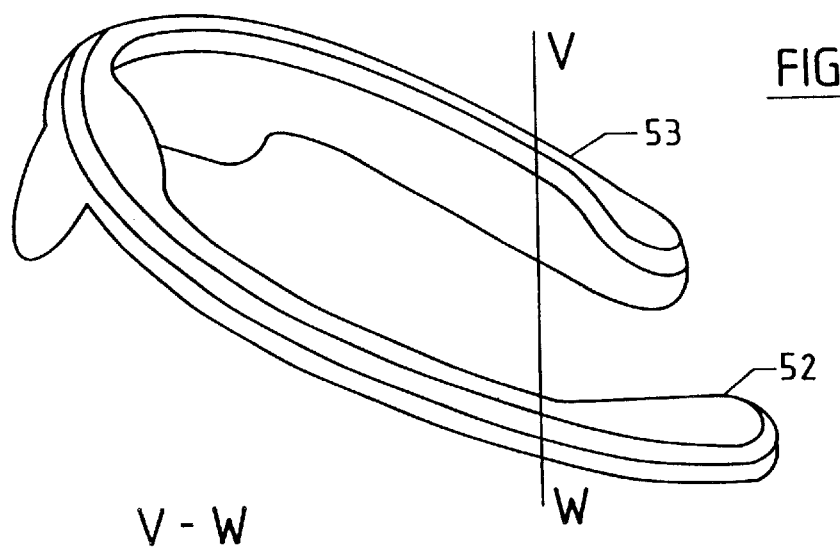
FIG. 34 is a perspective view of a further embodiment of a base carrier.
Figure 35:
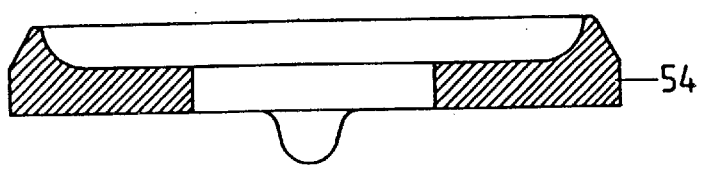
FIG. 35 is a cross-sectional view of the base carrier according to FIG. 34 along line V-W.
Figure 36:
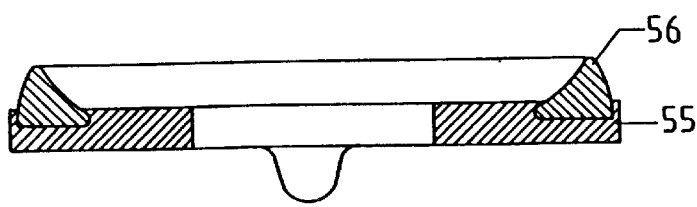
FIG. 36 is a lateral view of a revised embodiment of FIG. 34.

FIGS. 30–32 show closed, exchangeable contact surfaces 49 with track irons 50 mounted thereon which means that they are fixed thereto, and are mounted by means of fastening screws 51 to the shoeing system. FIG. 31 shows the track irons as being movable is shiftable at an angle to each other, and movable in longitudinal holes. FIG. 33 shows a shoe insert with upwardly directed bead at the inner side in the form of a hose profile and with fixing beads at the outer side. The shoe insert within the heel area is provided with laterally and outwardly extending preformed extensions, knobs or the like connected within the heel area to the outer rim of the shoe insert facing the other hoof, which prevent injuries when the horse shoe of the one leg hits the other leg, or warms the horse. According to FIG. 34 the base carrier 53 is formed with widened ends 52 of the legs and a gripping rim. The cross-sectional view of FIG. 35 shows a base carrier 54 with a gripping rim formed in one piece which is of the same material as the base carrier. The embodiment according to FIG. 36 shows a base carrier 55 with one-piece gripping rim 56 of a material which is more durable than the base carrier. According to a further embodiment of the system according to FIGS. 1 and 2 the shoe insert according to FIGS. 37 and 38 can be formed as a full surface insert 57 rather than a horse shoe-shaped cushioning insert, in order to prevent access of dirt or the like at the underside of the hoof. In order to allow the insert 57 to deflect in the rear area (similar to the attenuation insert 2 according to FIG. 1), the full-surface insert is provided with a fan-shaped, closed folded surface 58 so that the closed surface insert in the rear area is able to stretch or compress within the plane of the insert, if the hoof is stressed. The insert is provided with beads 59, 59' which are integrated into the insert and which on the one hand allow a lateral movement of the hoof and on the other hand, restrict such movement.

What is claimed is:

1. A shoeing system comprising a base carrier and an insert, said insert being made of a cushioning material, and positioned between a hoof and said base carrier, said insert having a front part adapted to the front part of said base carrier and the shoeing system is nailed only in the front area of the shoeing system between said hoof and said base carrier, and a rear part of the shoeing system, which is not nailed, but is laterally movable relative to the base carrier in a rear area of said shoeing system together with said hoof, and further comprising a bead provided on the inner sides of said insert at least at a heel area facing said hoof, which allows an inwardly directed movement of said insert relative to said base carrier, restricts outwardly directed movement and is made of the cushioning material of the insert.

2. The system according to claim 1, further comprising a gliding member positioned between said insert and said base carrier at a heel end of said insert and fastened to the base carrier by means of a fixing element, and is movable around the fixing element axis, the friction coefficient of said gliding member being selected independent of a friction coefficient of said insert.

3. The system according to claim 2, wherein said gliding member at least partially covers said insert in a heel area, and is connected with said insert.

4. The system according to claim 2, wherein said gliding member is connected to said insert.

5. The system according to claim 2, wherein said gliding member is provided with fixing means, which can be fastened to a recess of said base carrier.

6. The system according to claim 2, wherein said insert has a recess and the recess receives said gliding member having the same thickness as said insert.

7. The system according to claim 1, wherein said bead facing said hoof extends at least partially around a periphery of the hoof.

8. The system according to claim 1, wherein said insert is of a resilient material selected from rubber or plastic.

9. The system according to claim 1, wherein said bead is a profile, which can be solid or hollow, and contacts said inner side of said hoof, and extends along a peripheral direction, and also extends from at least one part of said insert upwards to said hoof.

10. The system according to claim 1, wherein said bead is a solid or hollow profile, contacts said inner side of said hoof and extends in the peripheral direction, and at least in part downwardly to a contact surface from said insert.

11. The system according to claim 1, further comprising a gripping iron which is fastened to said base carrier at several mounting positions and is provided with an increased tracking profile extending over substantially the entire periphery of said base carrier and is formed between said base carrier and said gripping iron for receiving a second attenuation insert.

12. The system according to claim 11, wherein said gripping iron is a closed-surface plate provided with an increased tracking iron and with track adjustment means.

* * * * *